Patented Apr. 6, 1948

2,439,119

UNITED STATES PATENT OFFICE 2,439,119

PRODUCTION OF MASHED POTATO POWDER

Arthur Kenneth Willetts and Theodore Rendle, Histon, England, assignors, by mesne assignments, to M. P. P. (Products) Limited, Norwich, England No Drawing. Application November 15, 1945, Serial No. 628,960. In Great Britain December 1, 1944

12 Claims. (Cl. 99—207)

This invention is concerned with improvements in and relating to the production of mashed potato powder and it relates more particularly to an improved process for the production of mashed potato powder in a form adapted on the mere addition of hot water, to be immediately reconstituted to a non-sticky, palatable and natural potato mash.

It has been well known for some time that the drying of cooked mashed potatoes is a difficult operation, as unless special precautions are taken, the material acquires a horny or rubberlike consistency, or else is converted into a sticky mass, being in either case quite useless for purposes of reconstitution.

Among various proposals which have been made for overcoming these difficulties, reference may be made to British specification No. 542,125, which describes a process in which the potatoes, after being cooked and mashed, are allowed to stand for a conditioning period, either at an elevated temperature, at a low or moderate temperature or even at a temperature of or below 0° C., which treatment is said to reduce the tendency of the mass to develop a sticky character, the mass being subsequently subject to a drying operation.

The average moisture content of ordinary cooked mashed potato is about 80% by weight. As a result of careful investigation one of the present inventors has already found that unless the moisture content is reduced to not exceeding about 40% by weight before the application of heat, the texture and palatability of the final product will be unsatisfactory if it is dried by any normal heating process, and that it is important throughout the process to avoid so far as possible, breaking or injuring the vegetable starch granule containing cells of the potato material.

The result of these latter investigations is embodied in British specification No. 566,167, corresponding to U. S. Patent No. 2,381,838, dated August 7, 1945, which describes a process for the preparation of cooked mashed potatoes, in powdered and readily reconstitutable form wherein the cooked and mashed vegetable is thoroughly mixed with an approximately equal weight of satisfactory seed powder, the mixture is reduced to the desired state of fineness, for instance by being subjected to a sieving operation and the powdered and sieved or otherwise reduced material is then dried, the said reducing and drying operations being so carried out as, so far as possible, to avoid breaking or bursting the vegetable starch granule containing cells. The term "satisfactory seed powder" was defined as a powder which when mixed with nearly boiling water, readily reconstituted to a non-sticky mashed potato closely resembling the normal household product. The preferred method of carrying out the drying operation is described in the said specification, which also mentions that if the mashed potato is frozen and then thawed, before addition of the seed powder an improvement in texture and quality is obtained.

The process described in the said specification has been found to give excellent results in large scale production but it is noteworthy that it depends on the use of satisfactory seed powder, obtained from some previous batch, for reducing the moisture content of the wet mash from its normal figure of about 80% to about 40% to enable the heat necessary for final drying to be applied without risk of damaging the product. It will be clear that the need regularly to return a substantial proportion of wholly or partially dried mashed potato powder to the plant for the purpose of "seeding" later batches of wet mash, necessarily reduces the output of any given plant, and that a process which, without impairing the quality of the final product, enables that product to be obtained either without the addition of any seed powder, or with the addition of only a much reduced quantity, of seed powder would represent a very valuable improvement in the said prior process.

The object of the present invention is to provide such an improvement.

Although it is well-known that it is not feasible to remove moisture from cooked and mashed potatoes by application of pressure, as by means of a centrifugal machine, we have made the surprising discovery that if cooked and mashed potato is frozen and then allowed to thaw, subsequent centrifuging will remove a considerable proportion of the moisture. The amount of moisture which can be extracted in this way appears to vary according to the centrifugal force employed and to some extent to depend on the particular potatoes being used, and on the rate at which the mash is frozen and/or thawed. In the experiments which have so far been conducted the range of the moisture content after freezing, thawing and centrifuging has been found to be between about 60% and about 40%.

It has further been found that a centrifugal material the moisture content of which is not greater than about 40% can be dried to a satisfactory and readily reconstitutable mashed potato powder by normal methods, such as those referred to in U. S. Patent No. 2,381,838 but without the addition of any seed powder, provided that the precautions there mentioned are taken. Where the moisture of the centrifuged material is found to be greater than about 40%, we recommend that the seeding process be employed as described in said patent. It will be clear, however, that even when, after centrifuging, the moisture content is as high as 60%, a considerable saving in the amount of seed powder to be used, with a corresponding increase in output, will have been effected.

It is preferred to treat the thawed mash in a suitable centrifugal machine in order to separate the moisture mechanically, but any other means for the application of pressure such as a filter press or hydraulic press may be used, so long as injury to the starch granule containing cells which would result from grinding or crushing is avoided. We use the words "mechanical means" hereinafter to signify any device for exerting pressure, such as a centrifugal machine, a hydraulic or other suitable press or pressure rollers, which do not grind or crush the material or otherwise damage the starch granule containing cells.

According to the invention, therefore, there is provided a method of manufacturing cooked and mashed potatoes in powdered and readily reconstitutable form in which cooked and mashed potato is frozen, caused to thaw, moisture is removed from the thawed material by mechanical means and the powder is thereafter converted by drying into a powder suitable for keeping and for ready reconstitution into mashed potato.

Where the moisture content after removal of moisture from the thawed material by mechanical means exceeds about 40%, we prefer to mix the said material thoroughly with such a quantity of satisfactory seed powder as above defined as to reduce its moisture content to about 40% by weight, before applying the heat drying treatment.

The material is preferably dried down to a moisture content of not exceeding about 7% by weight and for this purpose any of the methods of drying referred to in the said specification No. 2,381,838 may be used. We prefer to use a pneumatic dryer, such for example as that described in British specification No. 566,170.

The material should of course be reduced to the required state of fineness and this may be done in any convenient manner, but without grinding, so that breakage of the cells containing the starch granules is avoided as far as possible. We prefer, as described in specification No. 2,381,838 to sieve the material gently through a sieve having 12–18 meshes per linear inch. This sieving may be applied after removal of moisture by mechanical means from the thawed material, if the moisture content does not then exceed about 40%; if the moisture content is greater than about 45% it should be reduced below that level by admixture with satisfactory seed powder before sieving. Alternatively the sieving may be left until after the final drying.

The operation of freezing and thawing may be carried out in any convenient manner and in any convenient plant. It is not possible to give any precise directions regarding the speeds at which the mash should be frozen or thawed, as the most favorable conditions appear to depend on various circumstances and to vary with different kinds of potatoes. In general however, it may be said that quick freezing appears to cause less destruction of cellular matter than slow freezing, but also results in the subsequent separation of less liquid. As for the purpose of the present invention a maximum separation of liquid and a minimum damage to cellular structure are desired, it has been found to be preferable to carry out the freezing step at a moderate rate between the two extremes of quick and slow.

It has also been found to be immaterial whether the mash is frozen in blocks of any suitable size, or in thin layers or small portions, nor does it appear to be necessary to provide any definite lapse of time between the freezing and the thawing steps, provided that the mash is maintained at a freezing temperature for long enough to ensure complete solidification not only of the adventitious moisture, but also of the liquid portion of the vegetable potato cells. In general it has been found that a temperature of not above about 26° F. is suitable for the freezing step, but any lower temperature is not detrimental.

The thawing may also be carried out in any convenient manner and may either be hastened by any suitable means or may be allowed to take place more slowly over a longer period, it being however obviously undesirable that the thawing should be so accelerated as to make possible the raising or the uneven raising of the thawed mass, or of any part thereof, to an elevated temperature. It can in fact be stated that, other things being equal it is preferable that as with the freezing, the thawing also should be "slow."

In many cases it may be desirable to determine the best freezing and thawing conditions by a few preliminary trials.

The separation of liquid from the thawed mash constitutes the most important part of the present invention, and it is to be noted that this liquid comprises not only a substantial part of the adventitious moisture, but also a substantial part of the liquid contents of the potato cells both of which parts are rendered separable from the solid material as a result of freezing and thawing. It is as a result of this prior separation of liquid from the solid component of the mash, that the increase in output compared with that obtainable by the process of U. S. Patent No. 2,381,838 can be obtained.

The liquor within the potato cells contains valuable soluble constituents of the potato as well as flavouring materials. These valuable constituents may be recovered, if desired, by collecting the separated liquor and either concentrating it and returning it to the mash of lowered moisture content prior to heat drying or with the seed powder, if such is being used, or by completely drying the said liquor and mixing the resulting powder with the dried mash.

The step of concentration of the separated liquor may be carried out in any suitable way, such for example as by climbing film evaporator or a vacuum pan, or by spray drying or other suitable means, and either with or without preliminary treatment by filtering and/or treatment with a suitable enzyme or other means of removing or converting any suspended and/or gelatinised starch or other constituents which might prove deleterious, and the same applies to the step of complete drying of the liquor to a powder for addition to the final product.

It has been found that the soluble solids present in the separated liquid may amount to about 4% of the weight of separated liquid although this figure may vary according to the kind of potatoes being used or according to seasonal variations.

Whilst the step of concentrating or completely drying the separated liquor so as to return its valuable contents to the mash will obviously reduce or perhaps even eliminate any saving in heat consumption as compared with the process of the said prior specification, the substantial improvement on that process represented by the increase in output for any given plant is of course unaffected by this step.

We claim:

1. A method of manufacturing cooked and mashed potatoes in powdered and readily reconstitutable form in which cooked and mashed potato is frozen and caused to thaw, moisture is removed from the thawed material by mechanical means and the powder is thereafter converted by drying into a powder suitable for keeping and for ready reconstitution into mashed potato.

2. A method of manufacturing cooked and mashed potatoes in powdered and readily reconstitutable form in which cooked and mashed potato is frozen and caused to thaw, moisture is removed from the thawed material by mechanical means and the material is then thoroughly mixed with such a quantity of previously prepared powdered and readily reconstitutable mashed potato powder as to reduce the moisture content of the mixture below about 40% by weight and the mixture is thereafter dried by heat.

3. A method as claimed in claim 1 in which the material is passed through a sieve before the final drying.

4. A method as claimed in claim 2 in which the material is passed through a sieve before the final drying.

5. A method as claimed in claim 1 in which the final drying is effected under reduced pressure.

6. A method as claimed in claim 2 in which the final drying is effected under reduced pressure.

7. A method as claimed in claim 1 in which the liquor removed by mechanical means is collected and concentrated and the concentrate is admixed with the material before final drying.

8. A method as claimed in claim 2 in which the liquor removed by mechanical means is collected and concentrated and the concentrate is admixed with the material before final drying.

9. A method as claimed in claim 1 in which the liquor removed by mechanical means is collected and evaporated and the residue is admixed with the dry potato powder.

10. A method as claimed in claim 2 in which the liquor removed by mechanical means is collected and evaporated and the residue is admixed with the dry potato powder.

11. A method of manufacturing cooked and mashed potatoes in powdered and readily reconstitutable form in which cooked and mashed potato is frozen and caused to thaw, moisture is removed from the thawed material by means dependent upon centrifugal force, and the powder is thereafter converted by drying into a powder suitable for keeping and for ready reconstitution into mashed potato.

12. A method of manufacturing cooked and mashed potatoes in powdered and readily reconstitutable form in which cooked and mashed potato is frozen and caused to thaw, moisture is removed from the thawed material by means dependent upon centrifugal force, and the material is then thoroughly mixed with such a quantity of previously prepared powdered and readily reconstitutable mashed potato powder as to reduce the moisture content of the mixture below about 40% by weight, and the mixture is thereafter dried by heat.

ARTHUR KENNETH WILLETTS.
THEODORE RENDLE.

REFERENCES CITED

The following references are of record in the file of this patent:

UNITED STATES PATENTS

| Number | Name | Date |
| --- | --- | --- |
| 2,381,838 | Rendle | Aug. 7, 1945 |
| 2,278,472 | Musher | Apr. 7, 1942 |
| 1,630,985 | Tival | May 31, 1927 |
| 2,292,447 | Irwin | Aug. 11, 1942 |
| 2,115,191 | Brubaker | Apr. 26, 1938 |

FOREIGN PATENTS

| Number | Country | Date |
| --- | --- | --- |
| 1,048 | Great Britain | Oct. 12, 1905 |